United States Patent
Renyer (10) Patent No.: US 9,844,185 B2
(45) Date of Patent: Dec. 19, 2017

(54) SEED TENDER

(71) Applicant: USC, LLC, Sabetha, KS (US)

(72) Inventor: Gregory A. Renyer, Sabetha, KS (US)

(73) Assignee: USC, LLC, Sabetha, KS (US)

( * ) Notice: Subject to any disclaimer, the term of this patent is extended or adjusted under 35 U.S.C. 154(b) by 0 days.

(21) Appl. No.: 15/233,195

(22) Filed: Aug. 10, 2016

(65) Prior Publication Data

US 2017/0057762 A1 Mar. 2, 2017

Related U.S. Application Data

(60) Provisional application No. 62/212,333, filed on Aug. 31, 2015.

(51) Int. Cl.
 *B60P 1/36* (2006.01)
 *A01D 90/00* (2006.01)
 *B60P 1/00* (2006.01)
 *B65G 41/00* (2006.01)
 *A01C 15/00* (2006.01)

(52) U.S. Cl.
 CPC ............ *A01D 90/00* (2013.01); *A01C 15/003* (2013.01); *B60P 1/00* (2013.01); *B65G 41/002* (2013.01); *B65G 2814/0326* (2013.01)

(58) Field of Classification Search
 CPC ......... A01C 15/003; A01D 90/00; B60P 1/00; B60P 1/36; B65G 2814/0326; B65G 41/002; B65G 41/005; B65G 21/12
 See application file for complete search history.

(56) References Cited

U.S. PATENT DOCUMENTS

| | | | | |
|---|---|---|---|---|
| 8,696,296 B2 * | 4/2014 | Claussen | ............. | B65G 41/005 198/317 |
| 8,974,170 B2 * | 3/2015 | Ryder | ................ | B65G 41/002 198/617 |
| 2006/0180062 A1 * | 8/2006 | Furrer | ................ | A01C 15/003 111/171 |
| 2014/0227068 A1 * | 8/2014 | Neufeld | .................... | B60P 1/36 414/304 |

* cited by examiner

*Primary Examiner* — Mark C Hageman
(74) *Attorney, Agent, or Firm* — Hovey Williams LLP

(57) ABSTRACT

A self-contained seed tender (20) includes a plurality of bins (48) as well as a conveyor system (30) with a lower conveyor (32) and a shiftable lift conveyor (34). The lift conveyor (34) is shiftable between a stowed, travel position astride the bins (48) and a central, rearwardly extending delivery position. A deployment assembly (38) serves to sequentially pivot the lift conveyor (34) about an upright axis, followed by lateral translation thereof to the central use position. The conveyor (34) can then be rotated and elevated as desired for off-loading of seeds. The tender (20) may also be used for delivery of other types of agricultural particulates.

17 Claims, 11 Drawing Sheets

SEED TENDER

CROSS-REFERENCE TO RELATED APPLICATION

This application claims the benefit of provisional application Ser. No. 62/212,333 filed Aug. 31, 2015, which is incorporated herein by reference in its entirety.

BACKGROUND OF THE INVENTION

Field of the Invention

The present invention is broadly concerned with tenders for seeds or other agricultural particulates, permitting the products to be loaded at a central location, such as a dealer, and subsequent transfer thereof to a field location where the products can be off-loaded to planters, fertilizer spreaders, or other field equipment. More particularly, the invention is concerned with self-contained tenders which are designed to be bodily mounted on a conventional trailer and include a lift conveyor, which can be selectively moved between a stowed position permitting safe travel, and a deployed position where the products may be off-loaded. A particular feature of the tenders is the ability to locate the lift conveyor at an infinite number of lateral and elevated positions, thereby facilitating rapid off-loading.

Description of the Prior Art

In many farming operations, planting is done using tractor-towed planters which include one or more seed or grain bins and apparatus for depositing seed into furrows traversed by the planters. In such operations, it is necessary to deliver the seed to the fields where the planters are located. To meet this need, so-called seed tenders have been developed which are typically self-contained mobile units which can be filled with seed at a dealer or other central location, and then moved to the fields. In order to be useful, such tenders must provide a means for readily moving seed from the tender to planters with a minimum of time and effort. Accordingly, tenders are commonly provided with elongated, swingable delivery conveyors, which can be raised or lowered as desired.

However, these delivery conveyors must be safely stowed in travel positions which do not interfere with travels of the tenders. Thus, the conveyors must be moved to positions which do not interfere with overhead lines or traffic. In some prior tenders, this design constraint has resulted in the inability to easily maneuver the conveyors to a variety of delivery positions in the field. In other words, the necessity of providing a safe travel position for the conveyors has limited the positions which the conveyors can assume in the field.

There is accordingly a need in the art for improved tenders which provide both a safe and secure stowed position for the delivery conveyors, while at the same time effectively allowing the conveyor to be moved an infinity of delivery positions in the field.

SUMMARY OF THE INVENTION

The present invention provides improved tenders for seeds or other agricultural particulate materials, which overcome problems associated with prior art tenders. Generally speaking, the tenders of the invention comprise a particulate bin presenting an outlet, together with a conveyor system including an elongated lift conveyor, where the system is oriented to receive particulate materials from the bin outlet and to deliver the materials from the lift conveyor for use thereof. The tenders further have a deployment assembly operably coupled with the delivery conveyor for selective movement of the delivery conveyor from a stowed position adjacent the bin to a delivery position where the delivery conveyor extends outwardly. The deployment assembly includes structure permitting selective pivoting of the delivery conveyor about an upright axis, and translatory movement of the delivery conveyor to the delivery position wherein the delivery conveyor may be laterally swung and elevated or lowered.

In preferred forms, the tenders include a plurality of particulate bins, with the conveyor system including a conveyor belt passing beneath each of the bins and having a terminal section oriented to deliver particulate materials from the conveyor belt to the delivery conveyor. Importantly, the delivery conveyor is laterally swingable through an arc of at least about 180°, in order to afford an infinite number of delivery positions. To this end, the deployment assembly includes an overall frame assembly supporting the lift conveyor and first, second, third, and fourth structures (each preferably comprising a hydraulic piston and cylinder assembly) for: (1) rotating the lift conveyor about an upright axis from the stowed position thereof to an intermediate position rotated outwardly from the stowed position; (2) translating the lift conveyor from the intermediate position to a centered position; (3) selectively swinging the lift conveyor throughout an arc of about 180°; and (4) selectively elevating the lift conveyor at any of the rotated positions thereof.

The invention also provides methods for delivery of particulate materials from a particulate bin, broadly comprising the step of shifting a lift conveyor from a stowage position adjacent said bin to a delivery position where the material extends outwardly relative to the bin, wherein the shifting step comprises the steps of: (1) pivoting the delivery conveyor about a first upright axis to an intermediate position; (2) translating the lift conveyor from the intermediate position to a centered position; (3) selectively swinging the lift conveyor about a second upright axis spaced from the first upright axis; and (4) selectively elevating the lift conveyor to a delivery position. Thereupon, particulate materials from the bin are transferred to the lift conveyor in order to deliver the particulate materials.

The swinging step advantageously permits selective swinging the lift conveyor about the second upright axis through an arc of at least about 180°, for maximum utility and ease of particulate delivery.

In certain embodiments, separate drive structures are used for the pivoting, translating, swinging, and elevating steps. Conveniently, the separate drive structures each include an individual piston and cylinder assembly.

In order to most easily transfer the particulates from the bin to the lift conveyor, an underlying transfer conveyor is provided so that particulates may be deposited onto the transfer conveyor for delivery to the lift conveyor.

DETAILED DESCRIPTION OF THE PREFERRED EMBODIMENT

Figure 1:
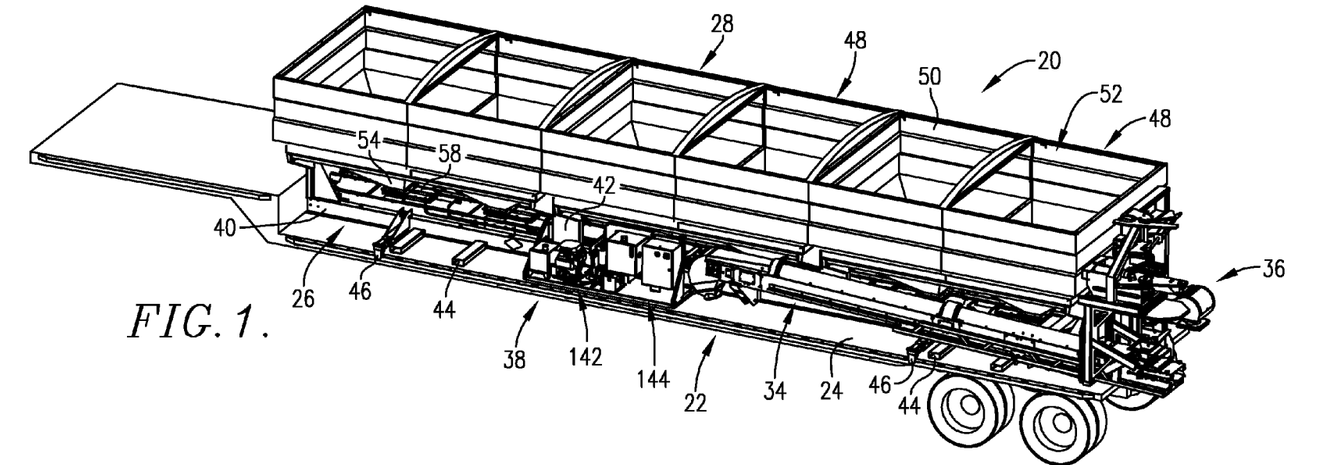
FIG. 1 is a perspective view of a seed tender in accordance with the invention mounted on a flatbed trailer, with the lift conveyor of the tender in its stowed, travel position.
Figure 2:
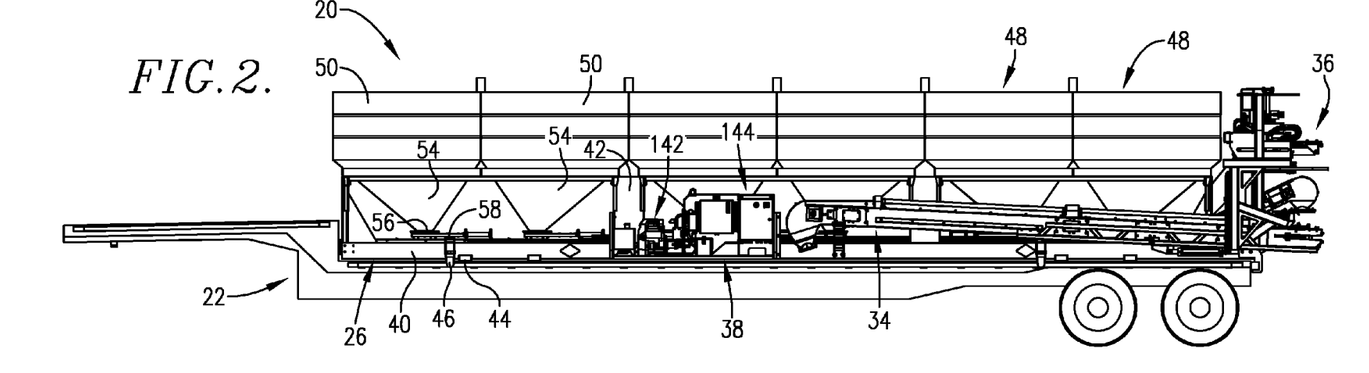
FIG. 2 is a side elevational view of the trailer-mounted tender depicted in FIG. 1.

Turning now to FIGS. 1-2, a tender 20 is illustrated, mounted on a trailer 22 presenting a flat bed 24. The tender 20 is designed to hold seed or other particulate materials, and is operable after loading to be transported via trailer 22 to a use location where the seed or particulates may be delivered.

Broadly speaking, the tender 20 includes a lowermost frame assembly 26 situated atop bed 24, a bin assembly 28 supported by frame assembly 26, a conveyor system 30 including a lower conveyor 32 extending generally horizontally beneath bin assembly 28, and a lift or delivery conveyor 34. The overall tender further includes a lift conveyor deployment assembly 36 and a power/control assembly 38. As explained more fully below, the lift conveyor 34 is selectively shiftable between a stowed, travel condition illustrated in FIGS. 1-3, and a deployed position shown in FIGS. 4-6.

The frame assembly 26 includes a plurality of elongated, laterally spaced apart lower beams 40 and spaced apart upright bin supports 42. Fore and aft laterally extending support tubes 44 are affixed to the undersides of the beams 40, and sit atop flatbed 24. A pair of adjustable bed clamps 46 are also provided, in order to secure the tender 20 against lateral movement on bed 24.

Figure 6:
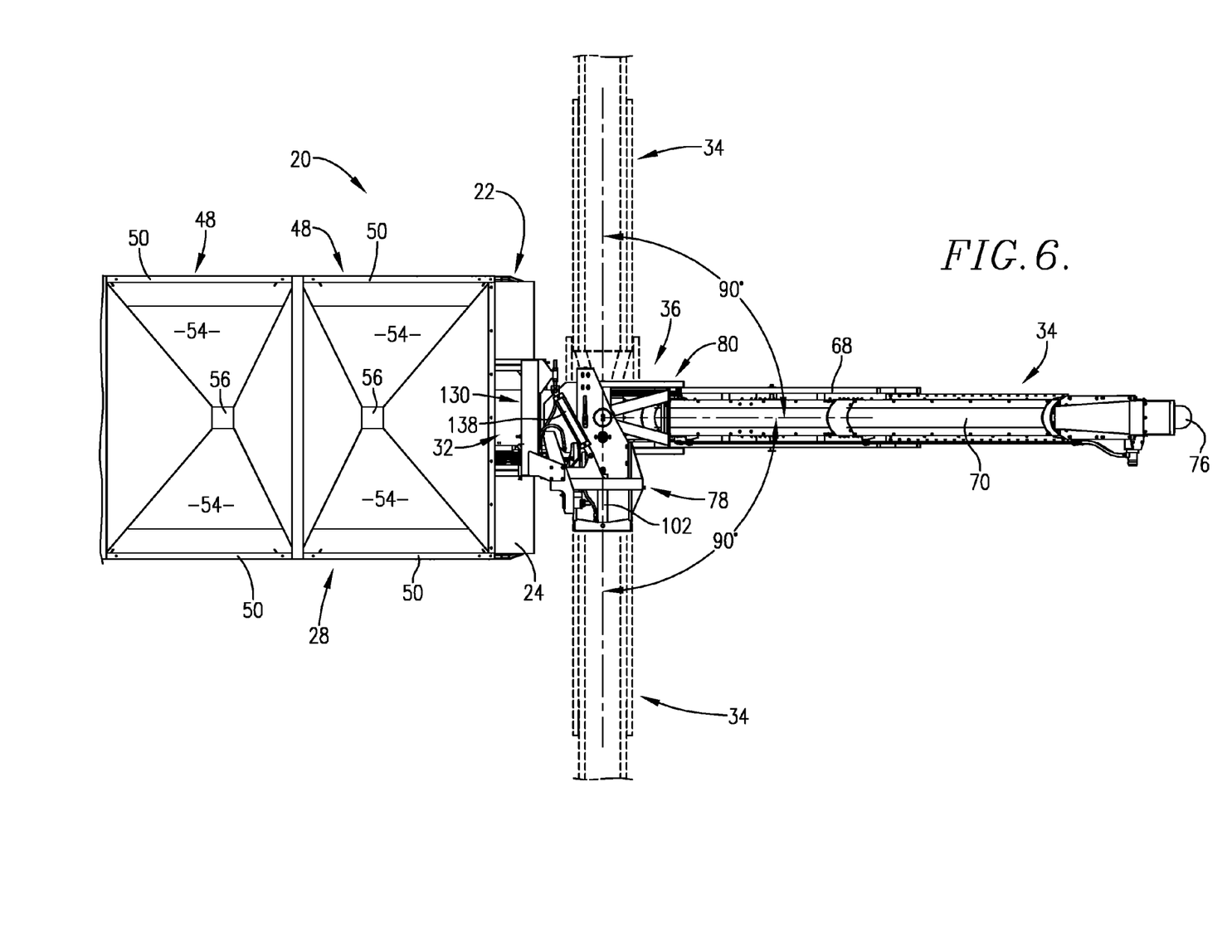
FIG. 6 is a fragmentary top view of the tender illustrated in FIG. 5, but showing in phantom the limits of side-to-side movement of the lift conveyor.
Figure 7:
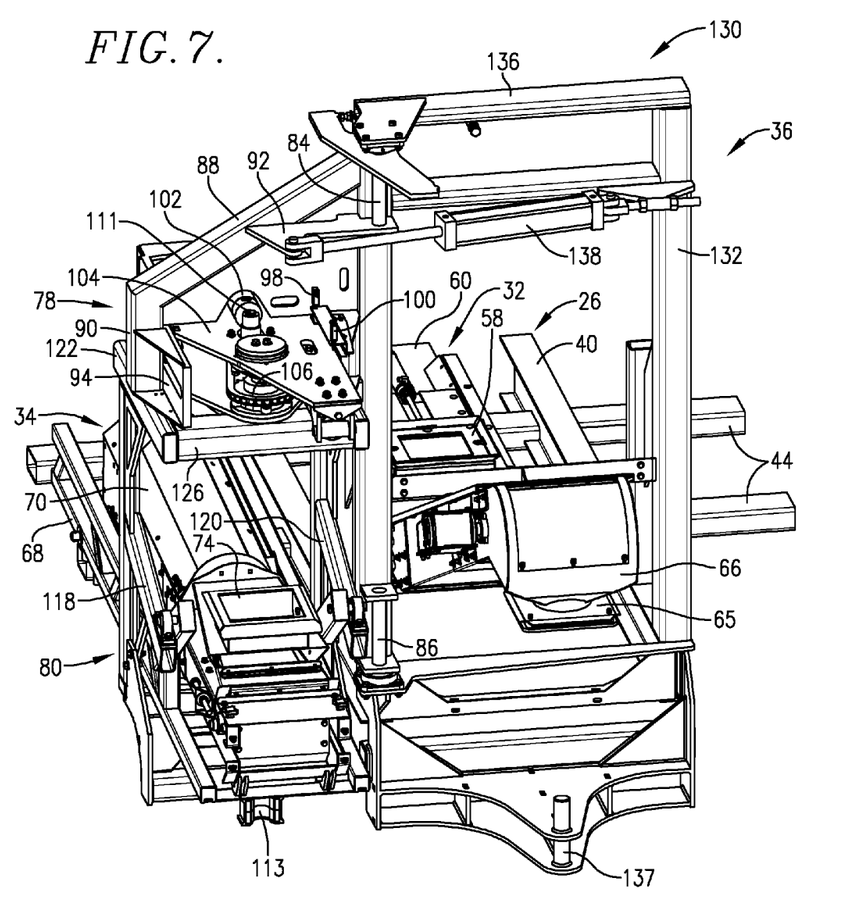
FIG. 7 is a perspective view of the rear end of the tender with the lift conveyor in its stowed, travel position, and further illustrating the details of the lift conveyor deployment assembly.
Figure 8:
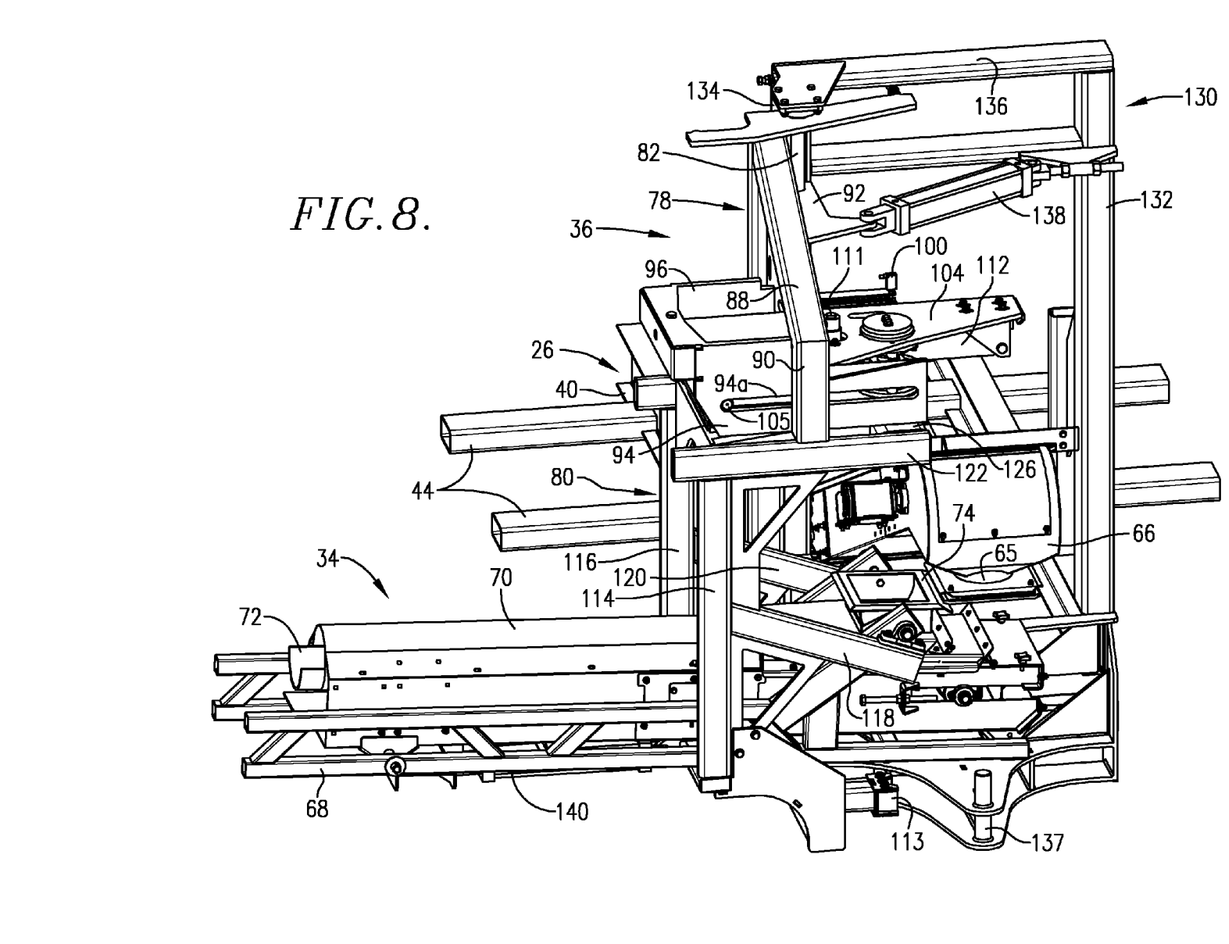
FIG. 8 is a view similar to that of FIG. 7, but illustrating the lift conveyor initially pivoted outwardly from the stowed position thereof.
Figure 9:
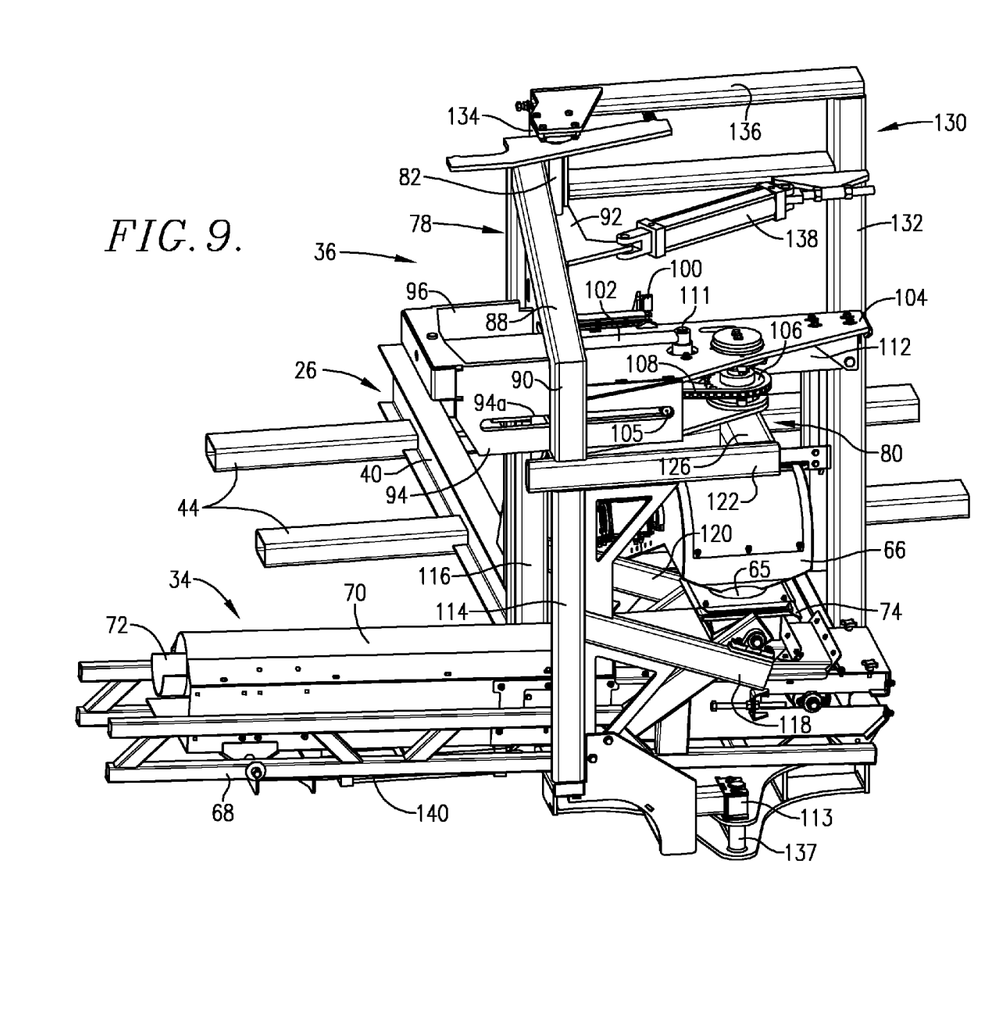
FIG. 9 is a view similar to that of FIG. 8, but illustrating the lift conveyor upon lateral translational movement thereof from the FIG. 8 position.
Figure 10:
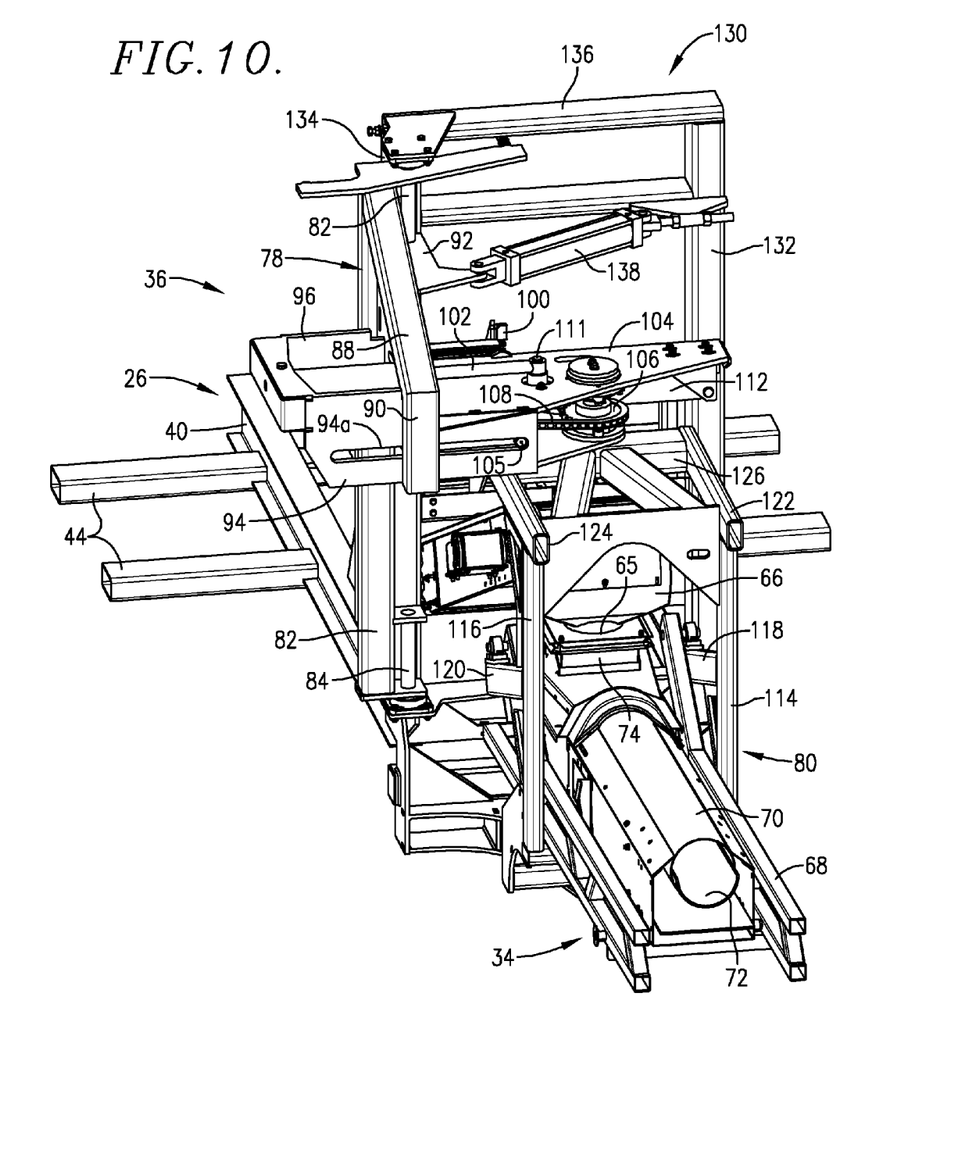
FIG. 10 is a view similar to that of FIG. 9, but illustrating the lift conveyor in its centered, rearwardly extending position illustrated in full lines in FIG. 6.

The bin assembly 28 includes a total of six upright bins 48, which are arranged in pairs between the supports 42 and along the length of the beams 40. Each bin 48 is quadrate in plan configuration and has upper walls 50 defining an open top 52, as well as lower converging wall structure 54 terminating in a lower delivery opening 56 (FIG. 6). A hydraulically operated slide gate assembly 58 is positioned beneath each delivery opening 56 and is selectively shiftable to open or close the opening 56 for delivery of seed or other particulates to lower conveyor 32, as required. Bin covers 59 (FIG. 3) may also be provided for protecting the contents of the bins 48 during road travel.

The lower conveyor 32 extends substantially the full length of the tender, and is conventionally supported by drive and idler rollers. The upper run 60 of conveyor 32 passes directly beneath each slide gate assembly 58 and is configured to receive material from the bins 48. The conveyor 32 has a rearmost section 62, which extends upwardly and terminates at drive roller 64, thereby providing a conveyor outlet 65. An arcuate cowling guide 66 is provided adjacent the terminal end of the conveyor 32.

The lift conveyor 34 includes an elongated support frame 68, which supports a tubular conveyor housing 70, the latter equipped with an internal conveyor belt 72 and an inlet 74 positioned directly beneath terminal roller 64 and cowling 66. A delivery spout 76 is provided adjacent the outermost end of the housing 70 to receive material delivered by belt 72.

Figures 3, 4:
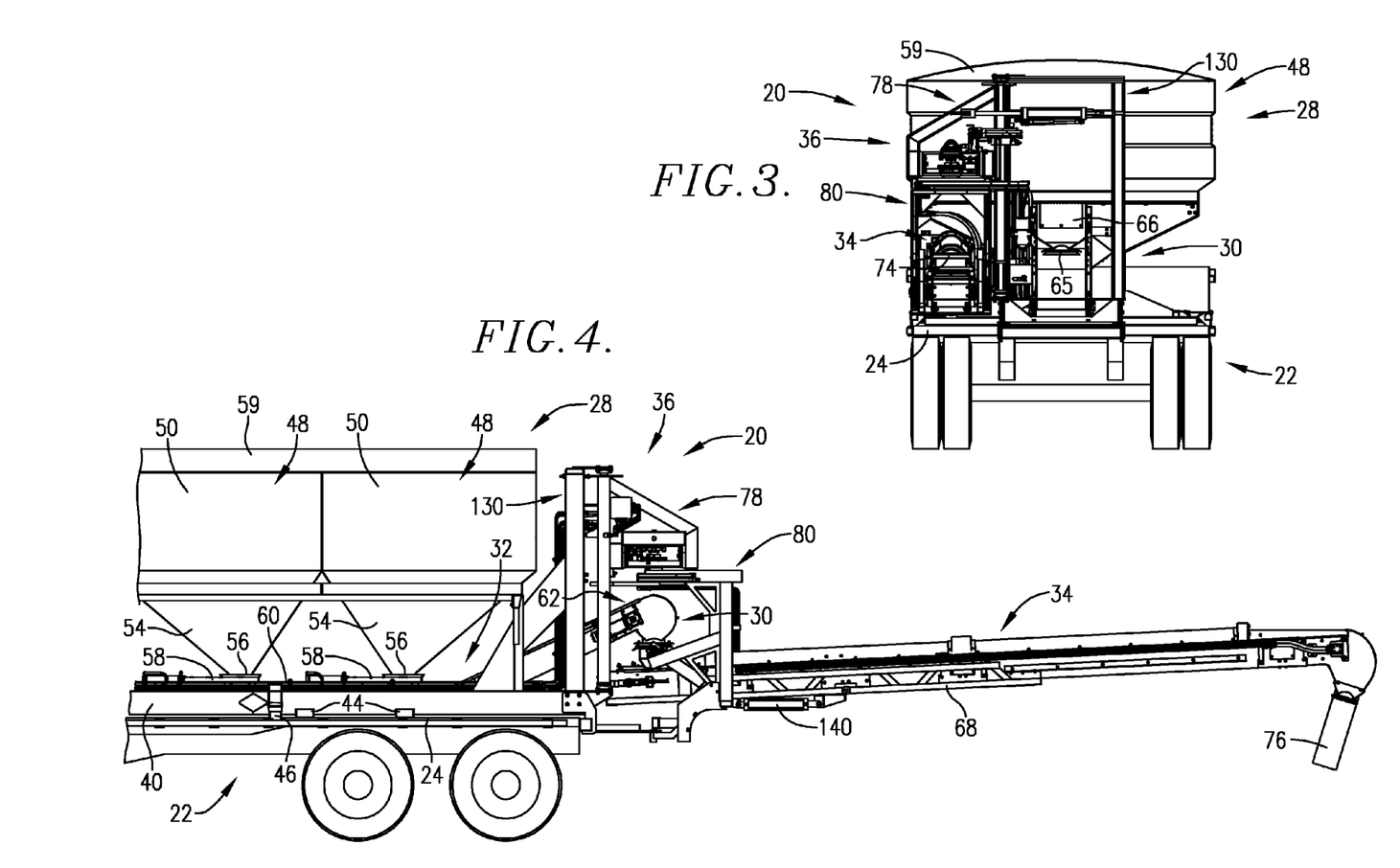
FIG. 3 is an end view of the trailer-mounted tender, depicting the delivery end of the tender.
FIG. 4 is a fragmentary side view of the trailer-mounted tender, shown with the lift conveyor in its extended position.
Figure 5:
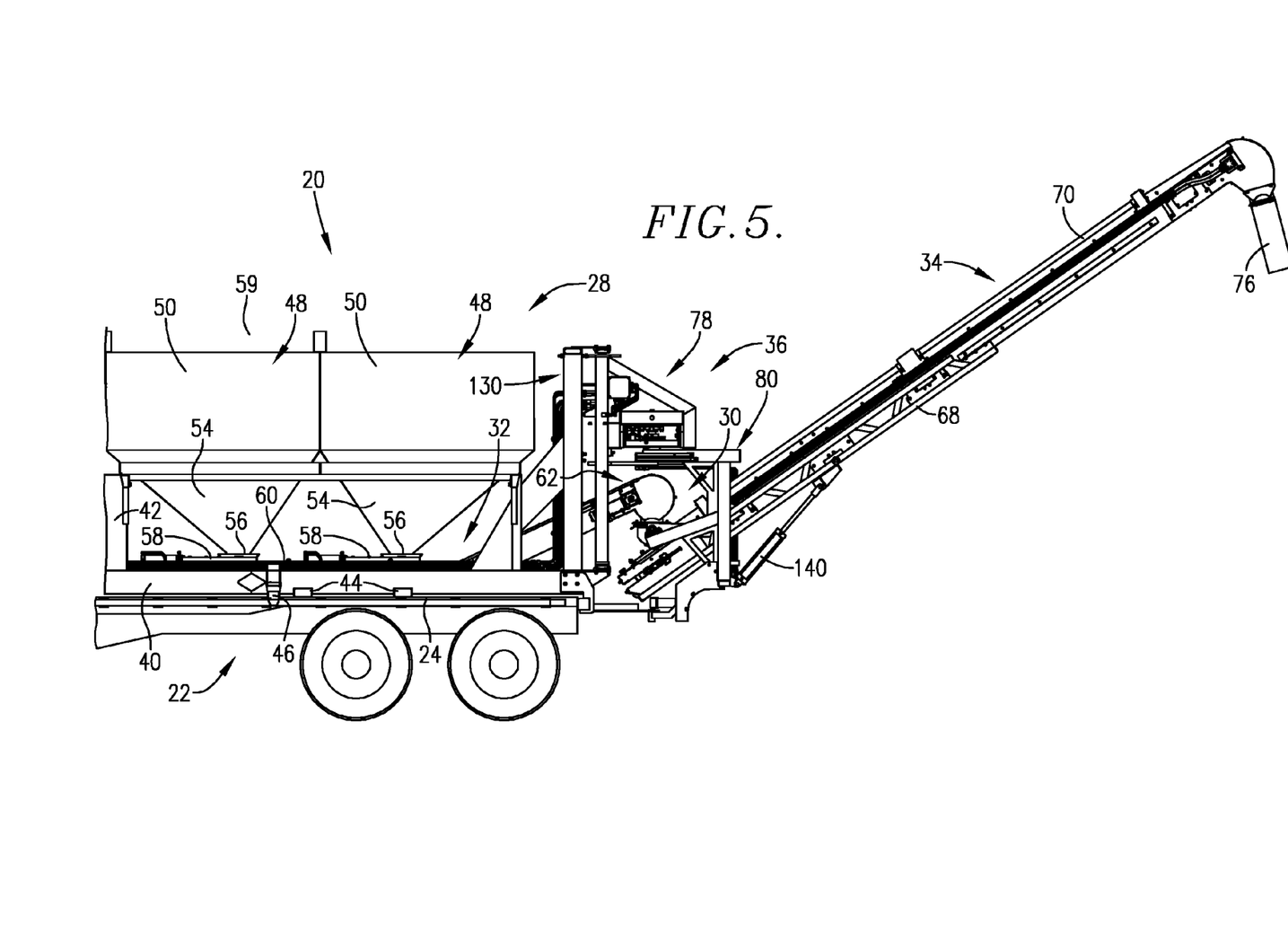
FIG. 5 is a side view similar to that of FIG. 4, but illustrating the lift conveyor in an elevated delivery position.

The lift conveyor displacement assembly is designed so as to permit the selective movement of lift conveyor 34 from its stowed, travel position depicted in FIGS. 1-3 to its extended use or delivery position shown in FIGS. 4-6. To this end, the assembly 36 permits rotary and translational movement of the lift conveyor 34 from the stowed position to a centered position at the rearmost end of trailer 22. The assembly 36 also permits swinging movement of the conveyor 34 through a full 180° arc of lateral movement in its centered position (FIG. 6), and elevational movement thereof at any lateral position.

In detail, the lift conveyor deployment assembly 36 broadly includes (FIG. 11), an upper swing frame assembly 78, and a lower sub-frame assembly 80, the latter supporting the frame 68 and lift conveyor 34. In more detail, the swing frame assembly 78 includes a vertical standard 82 equipped with upper and lower pivot pins 84 and 86 and an obliquely extending element 88 terminating in a vertical segment 90. A gusset plate 92 is secured to pin 84, as illustrated. A pair of guide plates 94, 96 are secured to segment 90 and standard 82, with the plates 94, 96 having horizontally extending slots 94a, 96a. The plate 96 also supports a pair of limit switches 98, 100. A piston and cylinder assembly 102 is also supported by the swing frame 78, as shown.

Figure 11:
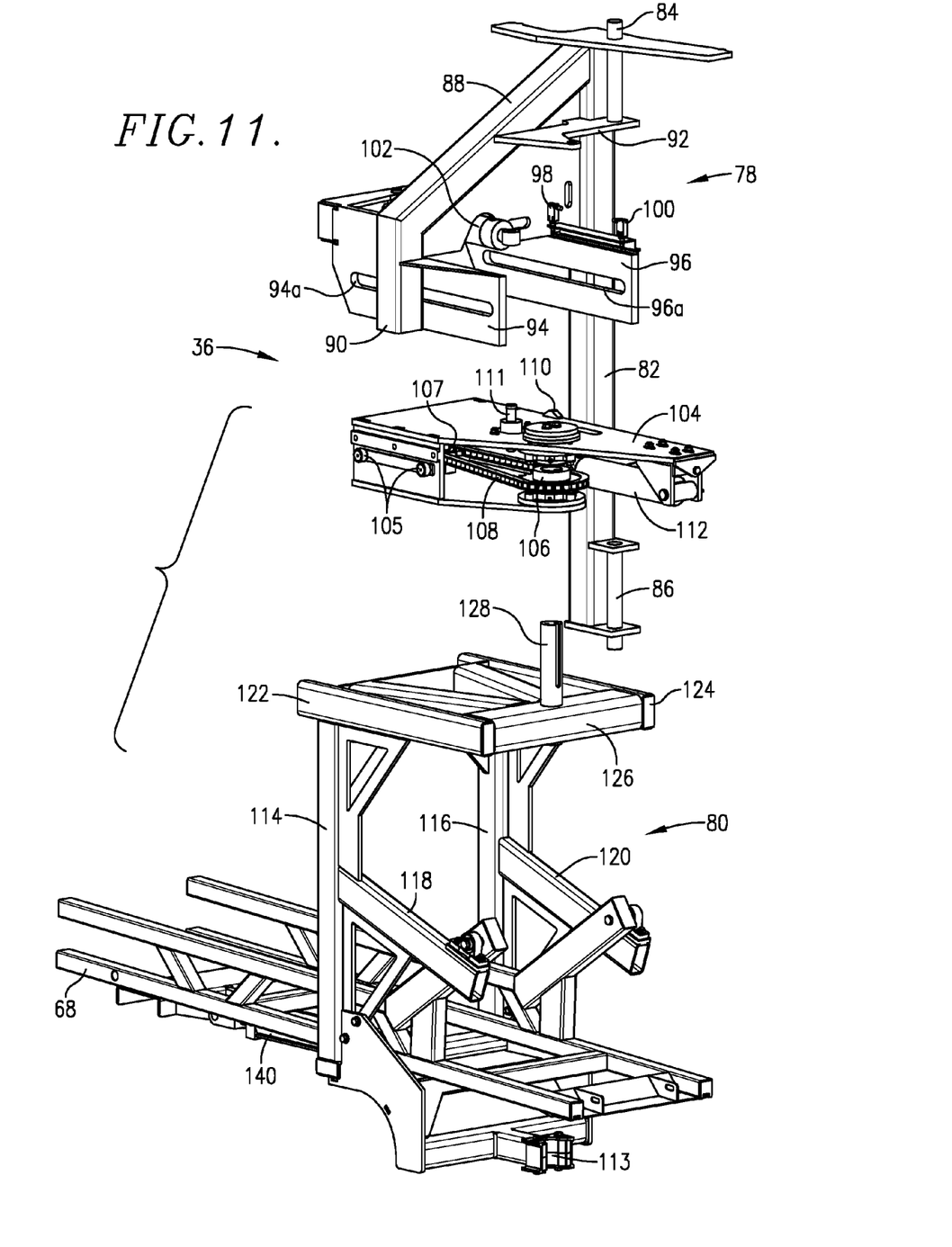
FIG. 11 is an exploded view depicting important components of the lift conveyor deployment assembly.
Figure 12A:
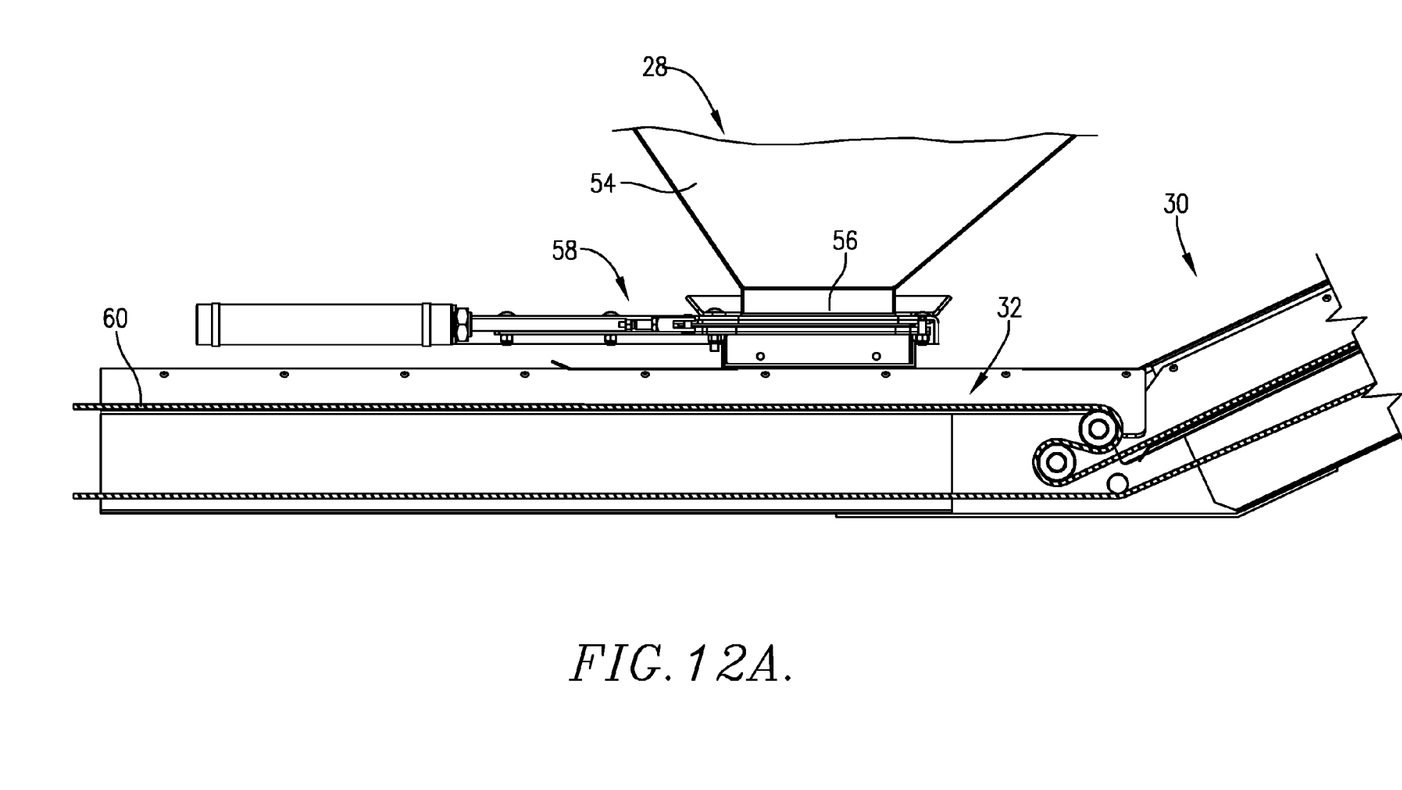
FIG. 12A is an enlarged, fragmentary view in partial vertical section, illustrating further details of the conveyor assembly.
Figure 12B:
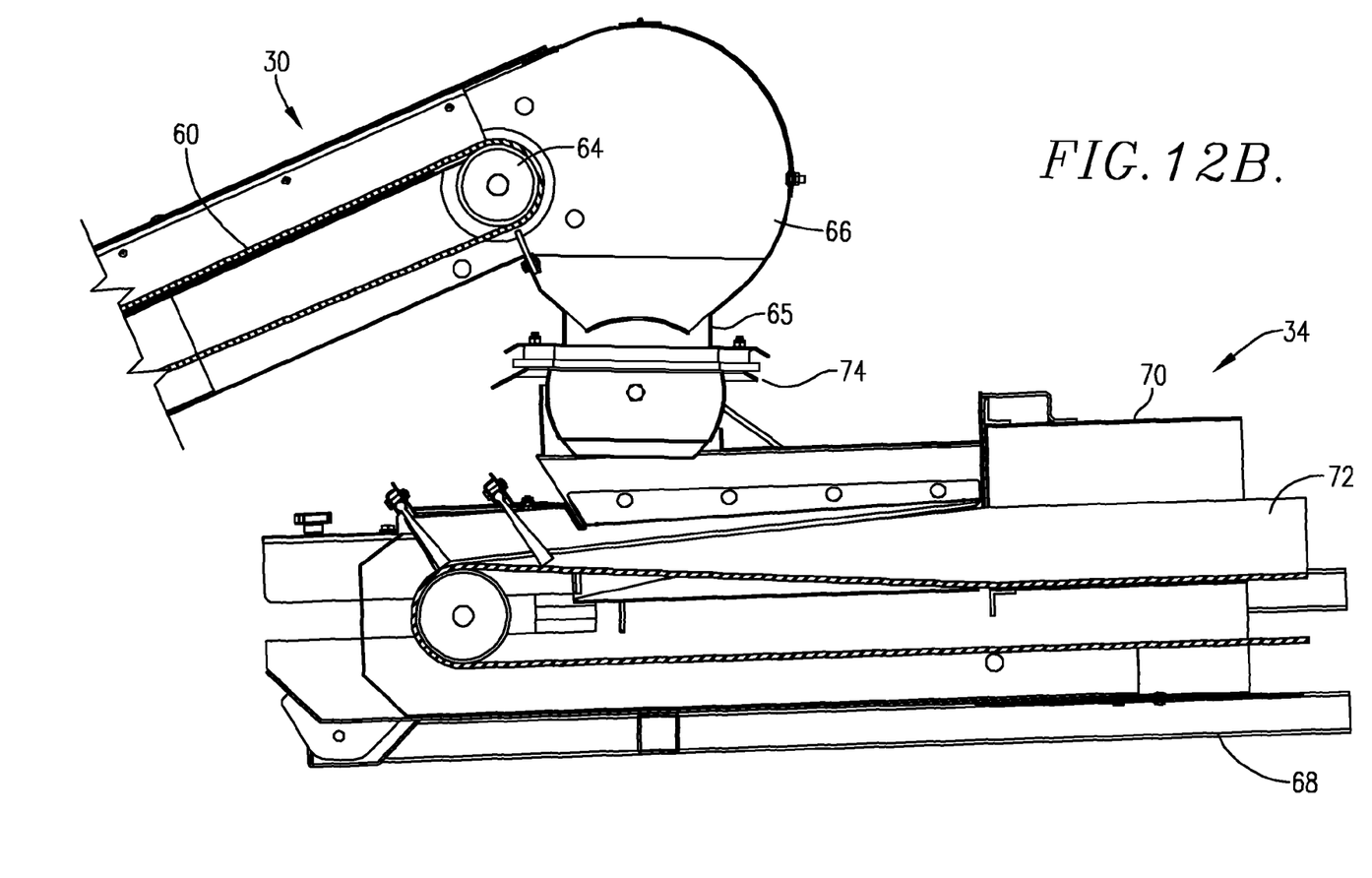
FIG. 12B is an enlarged, fragmentary view in partial vertical section, illustrating the transition between the lower conveyor and the lift conveyor.

A transition box 104 is located between the plates 94, 96 and includes opposed guide rollers 105 respectively located within the slots 94a, 96a of plates 94, 96. Box 104 also has a vertical shaft 128 of sub-frame 80 keyed to drive sprocket 106; the sub-frame 80 is rotationally suspended from box 104 of swing frame assembly 78 by means of shaft 128. A chain 108 is trained about the sprockets 106, 107. The upper plate of box 104 carries a switch lug 110, which engages the limit switches 98, 100, as well as a connector 111 which is secured to the rod of piston and cylinder assembly 102. Another piston and cylinder assembly 112 is located within box 104 and has the rod thereof operably connected to chain 108. The lower end of sub-frame 80 is equipped with a concave saddle 113.

The sub-frame assembly 80 includes a pair of posts 114, 116 and oblique bracing arms 118, 120. The latter are connected to frame assembly 68, as illustrated. The assembly 80 also has rearwardly extending legs 122, 124, and a rearmost crosspiece 126. The upstanding shaft 128 is secured to crosspiece 126 and drivingly interfits with sprocket 106.

Turning now to FIGS. 7-10, it will be seen that the swing frame assembly 78 is supported by an upright stationary frame 130, the latter including upright beams 132, 134 and an upper crosspiece 136. This frame assembly also includes a lower, upright, central locating pin 137, which is configured to mate with saddle 113. A piston and cylinder assembly 138 is pivotally secured to beam 134, with the rod thereof pivotally coupled with the end of gusset 92. Accordingly, retraction of assembly 138 serves to pivot swing frame assembly 78 from the FIG. 7 position to the FIG. 8 position thereof. This in turn pivots the sub-frame assembly 80, frame assembly 68 and lift conveyor 34 to the intermediate FIG. 8 position. In this position, it will be observed that the lift conveyor extends laterally at substantially a 90° angle relative to the longitudinal axis of tender 20. Moreover, it will be seen that the lift conveyor inlet 74 is laterally offset from the lower conveyor outlet 65.

In the next sequence, the sub-frame assembly 80, frame assembly 68 and lift conveyor 34 are translated laterally to a central position where the lower conveyor outlet 65 comes into mating relationship with the lift conveyor inlet 74. To this end, the piston and cylinder assembly 102 is actuated to shift the transition box 104 rightwardly, as viewed in FIGS. 8 and 9, between the limit switches 98, 100. This serves to center the lift conveyor 34 with saddle 113 coming into mating engagement with pin 137, in order to stabilize the lower end of sub-frame 80.

At this point, the conveyor 34 may be swung laterally through an arc of substantially 180°. This is accomplished by appropriate operation of piston and cylinder assembly 112, thereby causing corresponding shifting of chain 108 and rotation of sub-frame 80 and the lift conveyor. In order to elevate the lift conveyor, the piston and cylinder assembly 140 (see FIGS. 5 and 11) is actuated to raise or lower the lift conveyor.

The power/control assembly 38 is positioned forwardly of lift conveyor 34 and includes a conventional motor/hydraulic pump assembly 142 and control and circuit boxes 144. The assembly 38 is digitally controlled and provides appropriate hydraulic power to the components of the tender 20.

In the use of the tender 20 after the trailer 22 has been towed to a use position and lift conveyor 34 deployed as previously described, the slide gate assemblies 58 associated with the bins 48 are actuated as necessary to deliver appropriate quantities of seed or other particulate materials to the upper run 60 of conveyor 32, which in turn delivers the seed through outlet 65 and into inlet 74 of the lift conveyor 34. The belt 72 then conveys the seed upwardly along the length of conveyor 34 for ultimate delivery through the spout 76.

I claim:

1. A tender for particulate materials, comprising:
   a particulate bin presenting an outlet;
   a conveyor system including an elongated lower conveyor and a delivery conveyer, said lower conveyor oriented to receive particulate materials from said bin outlet and to deliver the particulate materials from the lower conveyor to the delivery conveyor;
   a deployment assembly operably coupled with said delivery conveyor for movement of the delivery conveyor from a stowed position adjacent said bin to a delivery position where the delivery conveyor extends outwardly from the bin,
   said deployment assembly including a first structure operable to pivot the delivery conveyor about an upright axis from said stowed position to an intermediate position, said upright axis being fixed relative to said bin, and a second structure operable to translate the delivery conveyor along a substantially rectilinear path of travel from said intermediate position to said delivery position, where the delivery conveyor may be laterally swung and elevated or lowered.

2. The tender of claim 1, including a plurality of said particulate bins, said lower conveyor including a conveyor belt passing beneath each of said bins and having a terminal section oriented to deliver particulate materials from the conveyor belt to the delivery conveyor.

3. The tender of claim 1, said delivery conveyor in the delivery position thereof being laterally swingable through an arc of at least 180°.

4. The tender of claim 1, said deployment assembly including a frame assembly supporting said delivery conveyor, said first structure operable to rotate the frame assembly and said delivery conveyor from said stowed position to said intermediate position rotated outwardly from the stowed position.

5. The tender of claim 1, said deployment assembly further including third structure operable to swing the delivery conveyor in the delivery position thereof.

6. The tender of claim 1, said deployment assembly further including fourth structure operable to elevate the delivery conveyor in the delivery position thereof.

7. The tender of claim 1, said tender being positionable upon a flatbed trailer.

8. The tender of claim 1, said deployment assembly including a stationary locating pin at said delivery position, and a saddle associated with said delivery conveyor, said saddle mating with said locating pin when said delivery conveyor is translated to said delivery position.

9. The tender of claim 1, said first and second structures comprising respective piston and cylinder assemblies.

10. The tender of claim 1, said particulate bin including upstanding upper wall structure and lower converging wall structure, there being an elongated stowage area beneath said converging wall structure, said delivery conveyor, in said stowed position thereof being at least partially located within said elongated stowage area below the converging wall structure.

11. A method for delivery of particulate materials from a particulate bin, comprising the steps of:
    shifting a delivery conveyor from a stowage position adjacent said bin to a delivery position where the delivery conveyor extends outwardly relative to the bin,
    said shifting step comprising the steps of using a first structure to pivot the delivery conveyor about a first upright axis to an intermediate position, said first upright axis being fixed relative to said bin and then using a second structure to translate the delivery conveyor along a substantially rectilinear path of travel from the intermediate position to a delivery position; and
    transferring said particulate materials from said bin to said delivery conveyor in order to deliver the particulate materials.

12. The method of claim 11, said particulate material being agricultural seeds.

13. The method of claim 11, including the step of swinging said delivery conveyor about a second upright axis when the delivery conveyor is in said delivery position thereof.

14. The method of claim 11, including the step of elevating said delivery conveyor when the delivery conveyor is in the delivery position thereof.

15. The method of claim 11, said particulate bin including upstanding upper wall structure and lower converging wall structure, there being an elongated stowage area beneath said converging wall structure, said shifting step further comprising the steps of pivoting said delivery conveyor from a stowage position at least partially within said stowage area to said intermediate position.

16. A tender for particulate materials, comprising:
a particulate bin including upstanding upper wall structure, lower converging wall structure, and an outlet, there being an elongated stowage area beneath said converging wall structure;
a conveyor system including an elongated lower conveyor and a delivery conveyer, said lower conveyor oriented to receive particulate materials from said bin outlet and to deliver the particulate materials from the lower conveyor to the delivery conveyor;
a deployment assembly operably coupled with said delivery conveyor for movement of the delivery conveyor from a stowed position adjacent said bin and at least partially within said stowage area, to a delivery position where the delivery conveyor extends outwardly from the bin,
said deployment assembly operable to first pivot said delivery conveyor about an upright axis from said stowed position to an intermediate position extending outwardly from the bin, said upright axis being fixed relative to said bin, followed by movement of the delivery conveyor to said delivery position along a substantially rectilinear path of travel.

17. A method for delivery of particulate materials from a particulate bin including upstanding upper wall structure and converging lower wall structure, there being an elongated stowage area beneath said lower wall structure, said method comprising the steps of:
shifting a delivery conveyor from a stowage position adjacent said bin and at least partially within said stowage area to a delivery position where the material extends outwardly relative to the bin,
said shifting step comprising the steps of pivoting the delivery conveyor about a first upright axis to an intermediate position extending outwardly from said stowage position, said upright axis being fixed relative to said bin and then translating the delivery conveyor from the intermediate position to a delivery position along a substantially rectilinear path of travel; and
transferring said particulate materials from said bin to said delivery conveyor in order to deliver the particulate materials.

* * * * *